United States Patent
Forte et al.

(10) Patent No.: US 10,039,033 B2
(45) Date of Patent: Jul. 31, 2018

(54) SYSTEMS, METHODS, AND MEDIA FOR IMPLEMENTING CALL HANDOFF BETWEEN NETWORKS

(75) Inventors: Andrea G. Forte, Brooklyn, NY (US); Henning Schulzrinne, Leonia, NJ (US); Arpit Mehta, Seattle, WA (US)

(73) Assignee: The Trustees of Columbia University in the City of New York, New York, NY (US)

(*) Notice: Subject to any disclaimer, the term of this patent is extended or adjusted under 35 U.S.C. 154(b) by 464 days.

(21) Appl. No.: 13/000,328

(22) PCT Filed: Jun. 22, 2009

(86) PCT No.: PCT/US2009/048188
§ 371 (c)(1),
(2), (4) Date: May 27, 2011

(87) PCT Pub. No.: WO2009/155613
PCT Pub. Date: Dec. 23, 2009

(65) Prior Publication Data
US 2011/0216737 A1    Sep. 8, 2011

Related U.S. Application Data

(60) Provisional application No. 61/074,593, filed on Jun. 20, 2008.

(51) Int. Cl.
*H04W 36/00* (2009.01)
*H04W 80/10* (2009.01)

(52) U.S. Cl.
CPC ... *H04W 36/0016* (2013.01); *H04W 36/0022* (2013.01); *H04W 80/10* (2013.01)

(58) Field of Classification Search
CPC ..... H04W 36/14; H04W 88/06; H04W 36/22; H04W 36/38; H04W 8/245; H04W 36/00;
(Continued)

(56) References Cited

U.S. PATENT DOCUMENTS 5,289,525 A    2/1994  Issenmann et al.
6,985,732 B1   1/2006  Ekman et al.
(Continued)

OTHER PUBLICATIONS

Handoff between VoWLAN Cellular by Tze HungJu, This report is submitted in partial fulfillment of the requirements for the degree of Master of Engineering in Telecommunication, Nov. 2004.*
(Continued)

*Primary Examiner* — Ayaz Sheikh
*Assistant Examiner* — Debebe Asefa
(74) *Attorney, Agent, or Firm* — Byrne Poh LLP (57) ABSTRACT

Systems, methods, and media for implementing call handoff between networks are provided, in some embodiments, systems for implementing call handoff between networks are provided, the systems comprising: at least one device that: receives a call from a first endpoint; establishes a connection between the first endpoint and a conference; calls a second endpoint: establishes a connection between the second endpoint and the conference; and when one of the first endpoint and the second endpoint is able to be connected to a different network from a current network which the one of the first endpoint and the second endpoint is connected to the conference: establishes a connection between the conference and the one of the first endpoint and the second endpoint via the different network; and removes the connection via the current network between the one of the first endpoint and the second endpoint and the conference.

24 Claims, 8 Drawing Sheets

(58) Field of Classification Search
CPC ......... H04W 36/0016; H04W 36/0022; H04W 40/24; H04W 48/08; H04W 4/00; H04W 80/04; H04W 80/10; H04W 8/087; H04W 8/26
USPC .......................... 370/254–340; 709/201–213
See application file for complete search history.

(56) References Cited

U.S. PATENT DOCUMENTS

| | | | | |
|---|---|---|---|---|
| 7,986,665 | B2* | 7/2011 | Kezys et al. .................. | 370/331 |
| 8,380,859 | B2* | 2/2013 | Chaturvedi et al. .......... | 709/228 |
| 8,873,507 | B2* | 10/2014 | Chan ..................... | H04W 8/082 370/331 |
| 9,021,072 | B2* | 4/2015 | Atreya .................. | H04W 12/08 370/230 |
| 2006/0270447 | A1 | 11/2006 | Everson et al. | |
| 2007/0070948 | A1 | 3/2007 | Kezys et al. | |
| 2007/0189220 | A1 | 8/2007 | Oberle et al. | |
| 2008/0014926 | A1 | 1/2008 | Ono | |
| 2009/0215438 | A1* | 8/2009 | Mittal et al. .................. | 455/418 |

OTHER PUBLICATIONS

Seamless SIP-Based Mobility for Multimedia Applications by Nilanjan Banerjee, et al. IEEE Publication, Published Mar./Apr. 2006 issue.*

"Voice Call Continuity (VCC) Between Circuit Switched (CS) and IP Multimedia Subsystem (IMS); Stage 2 (Release 7)", Technical Report, 3rd Generation Partnership Project (3GPP): TS 23.206. 2007, 2007.

Azada, M.R.G., et al., "Seamless Mobility Across IMS and Legacy Circuit Networks", Bell Labs Technical Journal, vol. 10, No. 4, Mar. 7, 2006, pp. 25-38.

Banerjee, N., et al., "Seamless SIP-Based Mobility for Multimedia Applications", In IEEE Network, vol. 20, No. 2, Mar. 20, 2006, pp. 6-13.

International Preliminary Report on Patentability in International Patent Application No. PCT/US2009/048188, filed Jun. 22, 2009, dated Jan. 6, 2011.

International Search Report in International Patent Application No. PCT/US2009/048188, filed Jun. 22, 2009, dated Aug. 14, 2009.

Salsano, S., et al., "Seamless Vertical Handover of VoIP Calls Based on SIP Session Border Controllers", In Proceedings of the IEEE International Conference on Communications (ICC '06), Istanbul, TR, Jun. 11-15, 2006, pp. 2040-2047.

Shacham, R., et al., "Session Initiation Protocol (SIP) Session Mobility", Technical Report, Internet Engineering Task Force: RFC 5631, Nov. 18, 2007, available at: http://tools.ietf.org/html/draft-shacham-sipping-session-mobility-05.

Tze, H., "Handoff between VoWLAN and Cellular", MS Thesis, University of Toronto, Nov. 2004, pp. 1-49.

Wang, Q., et al., "Design and Evaluation of an Integrated Mobile IP and SIP Framework for Advanced Handoff Management", In Proceedings of the IEEE International Conference on Communications (ICC '04), Paris, FR, Jun. 20-24, 2004, pp. 3921-3925.

Written Opinion in International Patent Application No. PCT/US2009/048188, filed Jun. 22, 2009, dated Aug. 14, 2009.

Wu, X. and Schulzrinne, H., "SIPC, a Multi-Function SIP User Agent", In Proceedings of 7th IFIP/IEEE International Conference, Management of Multimedia Networks and Services (MMNS '04), San Diego, CA, USA, Oct. 2004, pp. 269-281.

* cited by examiner

FIG. 1

|   | 8 | 7 | 6 | 5 | 4 | 3 | 2 | 1 |
|---|---|---|---|---|---|---|---|---|
|   | \multicolumn{8}{c}{Redirecting number} |
|   | 0 | 1 | 1 | 1 | 0 | 1 | 0 | 0 |
|   | \multicolumn{8}{c}{information element identifier} |

| | | | | | | | | |
|---|---|---|---|---|---|---|---|---|
| | 8 | 7 | 6 | 5 | 4 | 3 | 2 | 1 |
| | Redirecting number | | | | | | | |
| | 0 | 1 | 1 | 1 | 0 | 1 | 0 | 0 |
| | information element identifier | | | | | | | |
| | Length of redirecting number contents | | | | | | | |
| | 0 ext | Type of number | | | Numbering plan identification | | | |
| | 0 ext | Presentation indicator | | | 0  0  0  0  0 Spare | | | |
| | 1 ext | 0  0  0 Spare | | | Reason for diversion | | | |
| | 0 | Number digits (IA5 characters) | | | | | | |

200 → (entire figure)
204 → Type of number row
206 → Numbering plan identification
208 → Presentation indicator row
210 → Reason for diversion row
212 → Number digits row

SYSTEMS, METHODS, AND MEDIA FOR IMPLEMENTING CALL HANDOFF BETWEEN NETWORKS

CROSS REFERENCE TO RELATED APPLICATION

This application claims the benefit of U.S. Provisional Pat. App. No. 61/074,593, flied Jun. 20, 2008, which is hereby incorporated by reference herein in its entirety.

STATEMENT REGARDING GOVERNMENT-FUNDED RESEARCH

This invention was made with government support under grant CNS 0202063 awarded by the National Science Foundation. The government has certain rights in the invention.

TECHNICAL FIELD

The disclosed subject matter relates to systems, methods, and media for implementing call handoff between networks.

BACKGROUND

Mobile devices for communicating media such as video and/or audio signals are seemingly ubiquitous in modern society. Such devices enable a user to communicate with another via audio and/or video, receive images, audio, and video from servers of desired content, and transmit images, video, and audio to others.

Typically, such devices use one of two network types to communicate: mobile telephone networks (such as GSM networks); and Internet protocol (IP) networks (such as IEEE 802.11 networks (or Wireless Fideility networks)). For example, a user of a modern mobile telephone can receive streaming video and audio (such as television programs), transmit movies made using the telephone, and even participate in a video telephone call. Similarly, mobile computing devices that are connected to 802.11 networks are able to do the same things.

Recently devices capable of connecting to both of these types of networks have become available. The existence of such devices has allowed users to realize the best of both types of networks. For example, mobile telephone networks are wide spread and enable a user to connect to the networks in an extremely large number of places, while 802.11 networks enable a user to realize extremely high speed connections as well as low-cost, or free, connections.

Existing mechanisms, however, do not provide an adequate mechanism to handoff a call from one of these types of networks to another.

SUMMARY

Systems, methods, and media for implementing call handoff between networks are provided. In some embodiments, systems for implementing call handoff between networks are provided, the systems comprising: at least one device that: receives a call from a first endpoint; establishes a connection between the first endpoint and a conference: calls a second endpoint; establishes a connection between the second endpoint and the conference; and when one of the first endpoint and the second endpoint is able to be connected to a different network from a current network which the one of the first endpoint and the second endpoint is connected to the conference: establishes a connection between the conference and the one of the first endpoint and the second endpoint via the different network; and removes the connection via the current network between the one of the first endpoint and the second endpoint and the conference.

In some embodiments, methods for implementing call handoff between networks are provided, the methods comprising: receiving a call from a first endpoint; establishing a connection between the first endpoint and a conference: calling a second endpoint: establishing a connection between the second endpoint and the conference; and when one of the first endpoint and the second endpoint is able to be connected to a different network from a current network which the one of the first endpoint and the second endpoint is connected to the conference: establishing a connection between the conference and the one of the first endpoint and the second endpoint via the different network; and removing the connection via the current network between the one of the first endpoint and the second endpoint and the conference.

In some embodiments, computer-readable media containing computer-executable instructions that, when executed by a processor, cause the processor to perform a method for implementing call handoff between networks are provided, the method comprising: receiving a call from a first endpoint; establishing a connection between the first endpoint and a conference; calling a second endpoint; establishing a connection between the second endpoint and the conference; and when one of the first endpoint and the second endpoint is able to be connected to a different network from a current network which the one of the first endpoint and the second endpoint is connected to the conference: establishing a connection between the conference and the one of the first endpoint and the second endpoint via the different network; and removing the connection via the current network between the one of the first endpoint and the second endpoint and the conference.

DETAILED DESCRIPTION

In accordance with various embodiments, mechanisms for implementing call handoff between networks are provided. These mechanisms can be used in a variety of applications, such as to handoff calls between mobile telephone networks such as GSM networks) and Internet Protocol networks (such as Wireless Fidelity ("Wi-Fi") networks), or any other suitable networks.

Figure 1:
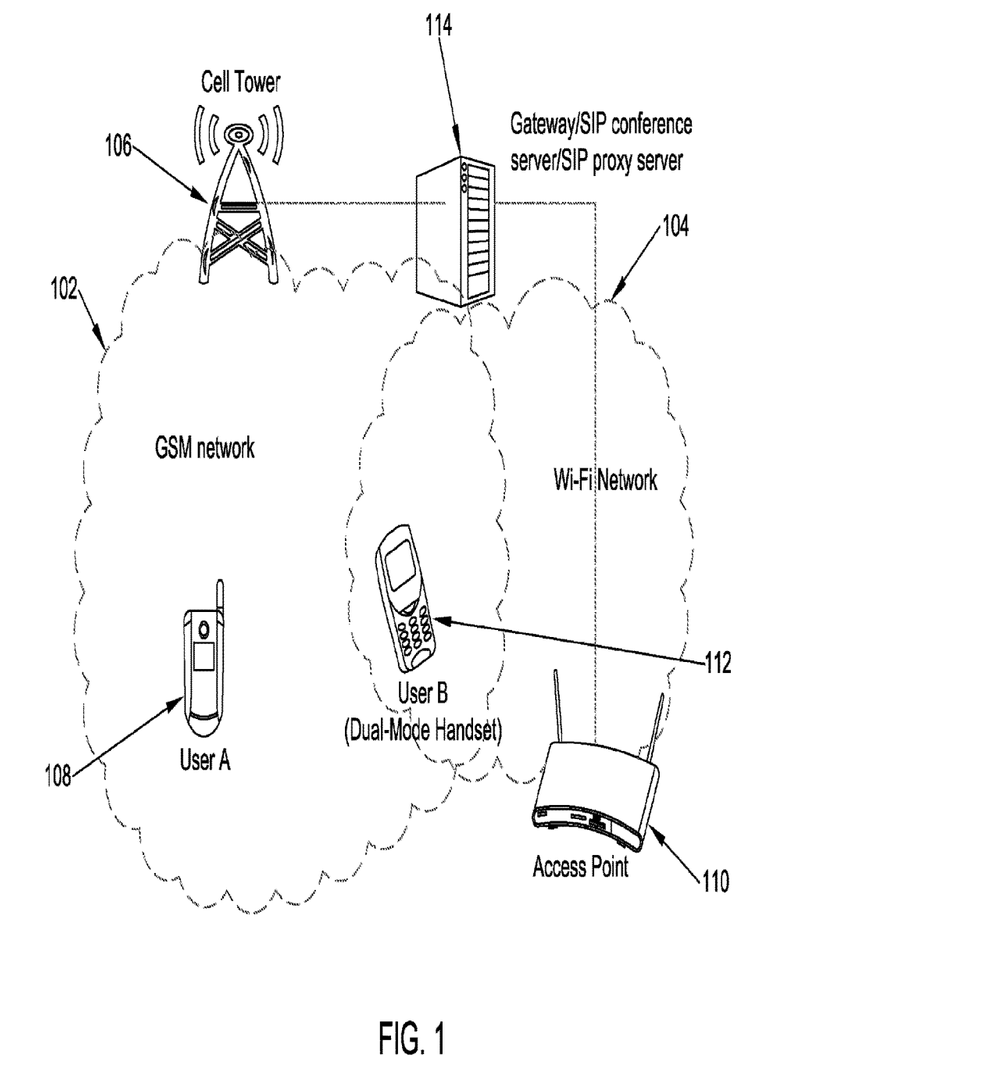
FIG. 1 is a diagram of hardware and networks that can be used in accordance with some embodiments.

In some embodiments, as shown in FIG. 1, a call can be made between two different networks, such as a GSM network 102 and a Wi-Fi net 104, in a system 100. The GSM network can be any suitable GSM network and can be provided through any suitable service provider. The Wi-Fi network can be any suitable Wi-Fi network, such as a wireless network in compliance with the IEEE 802.11(b), (g), or (n) standards. As illustrated m FIG. 1. GSM network 102 can include one or more cell towers 106. Such cell towers 106 can be used to provide wireless access points for an endpoint 108 used by a user A. Any suitable form of cell tower 106 can be used in some embodiments. Endpoint 108 can be any suitable device for accessing, GSM network, and can be used to perform a voice call, a video call, a voice and video call, a multimedia call, etc., to stream audio and/or video to or from the handset, etc. For example, endpoint 108 can be a handset such as a mobile telephone capable of accessing GSM networks on any suitable frequency. Wi-Fi network 104 can include one or more wireless access points 110. Wireless access points 110 can be used to provide a wireless access point for an endpoint 112 used by user B. Wireless access points 110 can be any suitable points of access for Wi-Fi network 104. For example, any of wireless access points 110 can be an IEEE 802.11(b), (g), or (n) wireless access point, a wireless router, etc. As illustrated, endpoint 112 can be any suitable device for accessing Wi-Fi network, and can be a dual mode endpoint (i.e., an endpoint capable of accessing Wi-Fi network 104 and GSM network 102 via an IP network and a GSM network, respectively), and can be used to perform a voice call, a video call, a voice and video call, a multimedia call, etc., to stream audio and/or video to or from the endpoint, etc. For example, endpoint 112 can be a handset such as a mobile telephone capable of accessing GSM networks and IP networks on any suitable frequency.

To enable calls on GSM network 102 to communicate with calls on Wi-Fi network 104, a network element 114, as described below, can be provided between the two networks. Any suitable one or more devices for implementing, the network element can be utilized. For example, in some embodiments, network element 114 can be implemented using one or more devices, such as a general purpose computer, special purpose computer (such as a client or a server), or a dedicated network appliance, acting as an ISDN PRI gateway, a session initiation protocol (SIP) conference server, and SIP proxy server. Any of these general purpose computer, special purpose computer, or dedicated network appliance can include any suitable components such as a processor (which can be a microprocessor, digital signal processor, a controller, etc.), memory, communication interfaces, display controllers, input devices, etc. Asterisk, an open source PBX (available at http://www.asterisk.org, which is hereby incorporated by reference herein in its entirety), can be used to implement a SIP proxy server, an ISDN PRI gateway, and a SW conference server (e.g., using the MeetMe conference component in Asterisk) in some embodiments. Additionally, a Digium Wildcard TE110P Single T1/E1 PCI card VoIP SiP IAX Asterisk PBX (available from http/www.voipsupply.com) can be used m network element 114 to connect Asterisk to a T1 trunk which can then be directly or indirectly coupled to a PBX of GSM network 102 and an Internet Protocol (IP) interface such as an Ethernet network card can be used to connect Asterisk to Wi-Fi network 104.

In some embodiments, any suitable computer readable media can be used for storing instructions for performing the processes described herein. In some embodiments, computer readable media can be transitory or non-transitory. For example, non-transitory computer readable media can include media such as magnetic media such as hard disks, floppy disks, etc), optical media (such as compact discs, digital video discs, Blu-ray discs etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments, whenever user 13 using endpoint 112 makes or receives a call, the call is routed to the SIP conference server in network element 114, a conference for that call is created, and the call is added to the conference. For example, when user B receives a call from user A (who is using endpoint 108), the call is forwarded by the GSM network of endpoint 112 to the SIP conference server via the ISDN PRI gateway and user A is added to a conference. The conference server then makes a call to user B via the ISDN PRI gateway and one of the GSM interface and the IP interface of endpoint 112, and user B is added to the same conference. At this point, users A and B are connected via the conference server. When handoff is appropriate (e.g., because user B has entered or left an IP network), the second network interface of user B is added to the same conference just before the handoff occurs. For a very short duration, user A and both interfaces of user B are on the same conference. Once the handoff has completed, the first interface of user 13 is not used any longer and is removed from the conference. Now user A and user B are in the same conference using one interface each. Similar is the case when user B makes a call to user A. If user 13 makes the call via the IP interface of endpoint 112, the call is first routed to the SIP conference server via the SIP proxy. If user B makes the call via the GSM interface of endpoint 112, the call is first routed to the SIP conference server via the ISDN PRI gateway. A new conference is dynamically created with only user B initially in that conference. User A is added to the same conference after a call is made to user A. A handoff takes place in the same way as in the previous scenario.

As mentioned above, calls can be forwarded by the GSM networks to the ISDN gateway/SIP conference server. A call forwarding supplementary service provided by the GSM networks enables the networks to redirect calls which are addressed to the telephone number associated with an endpoint (such as the endpoint of user B) to a telephone number of the ISDN gateway/SIP conference server. This is described in "Digital cellular telecommunications system (Phase 2+): Mobile radio interface layer 3 specification," ETSI EN 300 952, 1999, which is hereby incorporated by reference herein in its entirety. However, when the endpoint (such as the endpoint of user B) is operating on its GSM network, the gateway needs to be able to call the endpoint and not have that call forwarded by the GSM network back to the gateway. To address this issue, in some embodiments, a selective-call-forwarding mechanism can be used wherein the GSM network can selectively choose to not forward calls from a particular number, such as the number of the gateway. Additionally or alternatively, in some embodiments, a call-forwarding-on-busy mechanism can be used to prevent calls from looping from the gateway back to the gateway by triggering a busy signal on a callee's device (such as user B's endpoint), which will then cause the number to be forwarded, when a call is received from any number other than the gateway's number.

Figure 2:
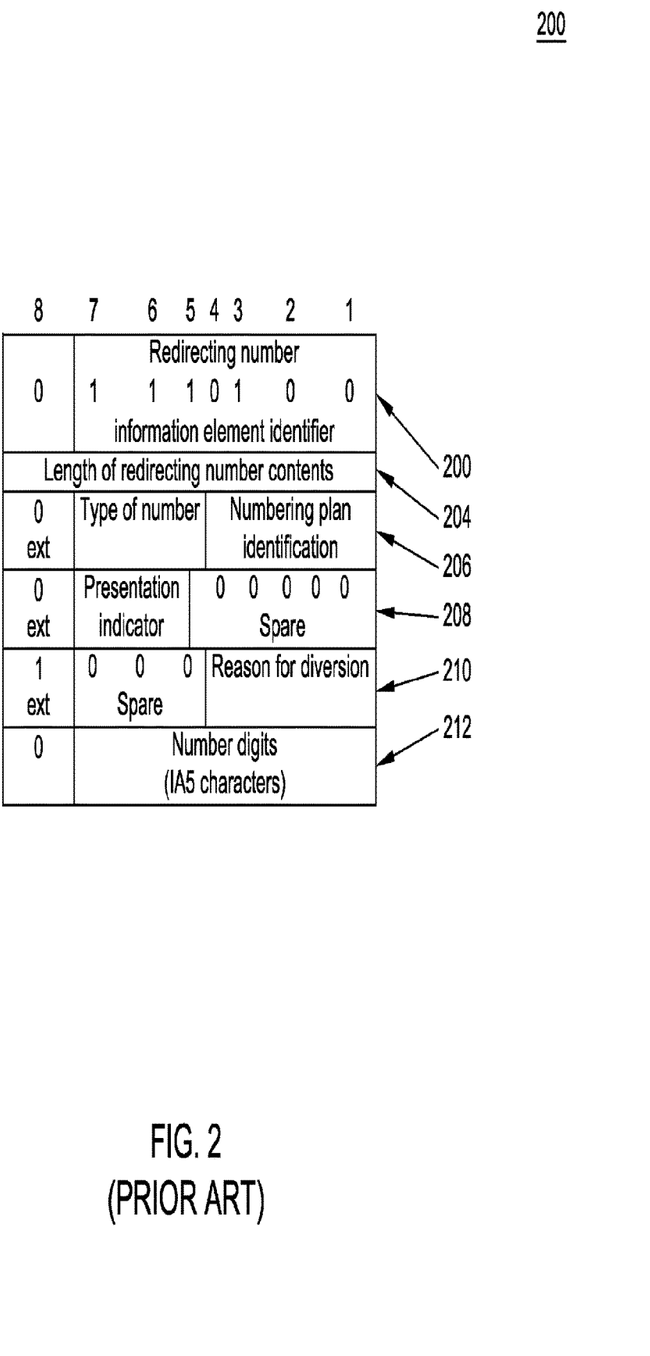
FIG. 2 is a diagram of a format of a Redirecting number information element can be used in accordance with some embodiments.

When the GSM network forwards call of user B to the ISDN PRI gateway, the gateway can get the number of user B from a Redirecting number information element that is included in the packets sent to the gateway by the GSM network of user B. In some embodiments, a format 200 of the Redirecting Number information element in ISDN can be as is illustrated in FIG. 2. This Redirecting Number information element can be used to enable the diverted-to user (that is the user to which the call has been forwarded, such as the gateway) to identify the ISDN number from which the diversion was invoked. As shown, format 200 includes a redirecting-number-in formation-element-identifier field 202, a length-of-redirecting-number-contents field 204, type-of-number and numbering-plan-identification fields 206, a presentation-indicator field 208, a reason-for-diversion field 210, and a number-digits field 212. Number-digits field 212 can be used to represent the user's number from which the call has been forwarded (e.g., user 13).

Figure 3:
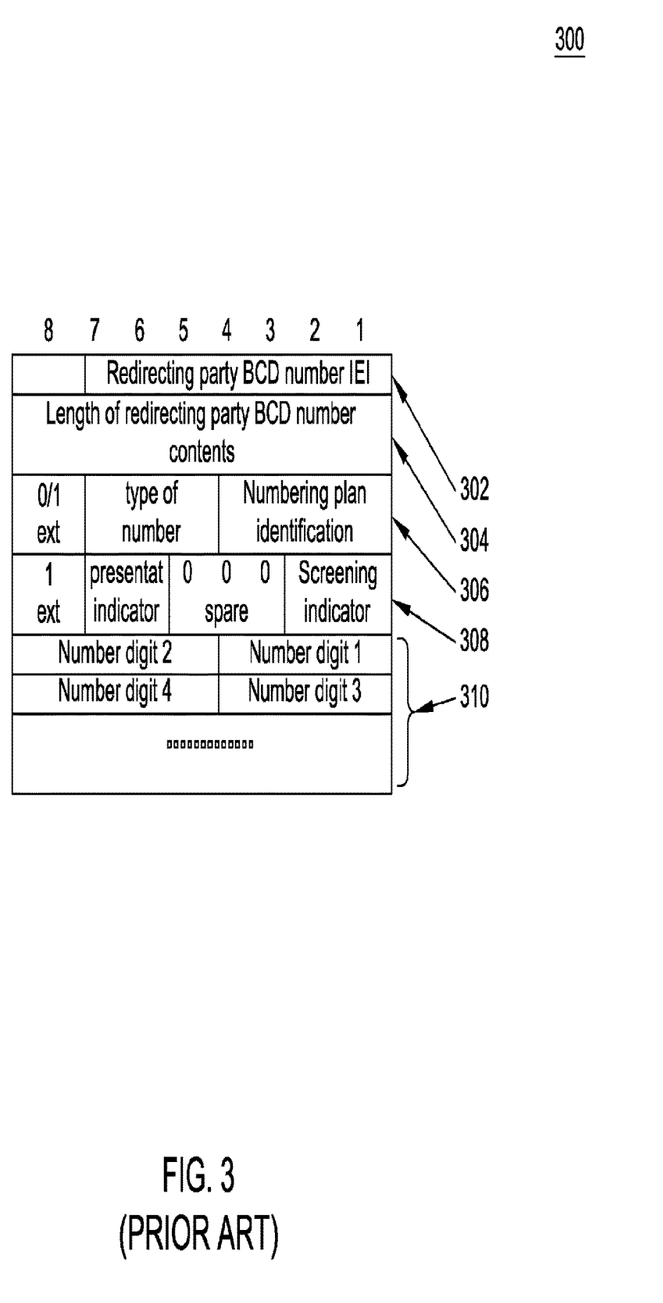
FIG. 3 is a diagram of a format of a Redirecting Party BCD Number information element that can be used in accordance with some embodiments.

Additionally or alternatively, the gateway can get the number of user B from a Redirecting Party BCD Number information element. In some embodiments, a format 300 of the Redirecting Party BCD Number information element in GSM can be as is illustrated in FIG. 3. This Redirecting Party BCD Number information element can be used to identify the redirecting party (e.g., user B). This format can include a redirecting-party-BCD-number-information-element-identifier field 302, a length-of-redirecting-party-BCD-number-contents field 304, type-of-number and numbering-plan-identification fields 306, presentation-indicator and screening-indicator fields 308, and number-digits fields 310 in some embodiments. The Number-digits fields can contain the number of the redirecting party.

Although call forwarding is described herein, in accordance with some embodiments, the need for call forwarding can be eliminated by providing a dedicated telephone number for every user-B-type of user at the gateway. This way, when a user A calls such a telephone number, the call will go straight to the gateway. The gateway will also associate all calls to that telephone number with a specific user B.

A soft handoff technique where one interface is disconnected only after the other one is connected can be used in accordance with some embodiments. In this way, the user is always connected during a handoff. To effect a handoff an ISDN layer 3 protocol called Q.931 can be used in some embodiments. The Q.931 protocol is responsible for setting up connections between the user station and the network and for terminating the connection when one of the parties in the connection issues a disconnect request, such as when going on-hook. Two Q.931 message types, (CONNECT and DISCONNECT, can be used to figure out when to complete the handoff. The CONNECT message can be sent when the called party picks up the telephone to signal the acceptance of the call by the called party. The DISCONNECT message can be sent when either the called or the calling party hangs up the telephone, that is, ends the call.

As mentioned above, in some embodiments. Asterisk (including its MeetMe conference server component) can be used to implement the ISDN gateway, the SIP proxy, and the SIP conference server. In doing so, a dialplan can be used as a master plan of control or execution flow for all of Asterisk's operations. For example, the dialplan can control how incoming and outgoing calls are handled and routed, how connections through the PBX behave, etc.

Figure 4:
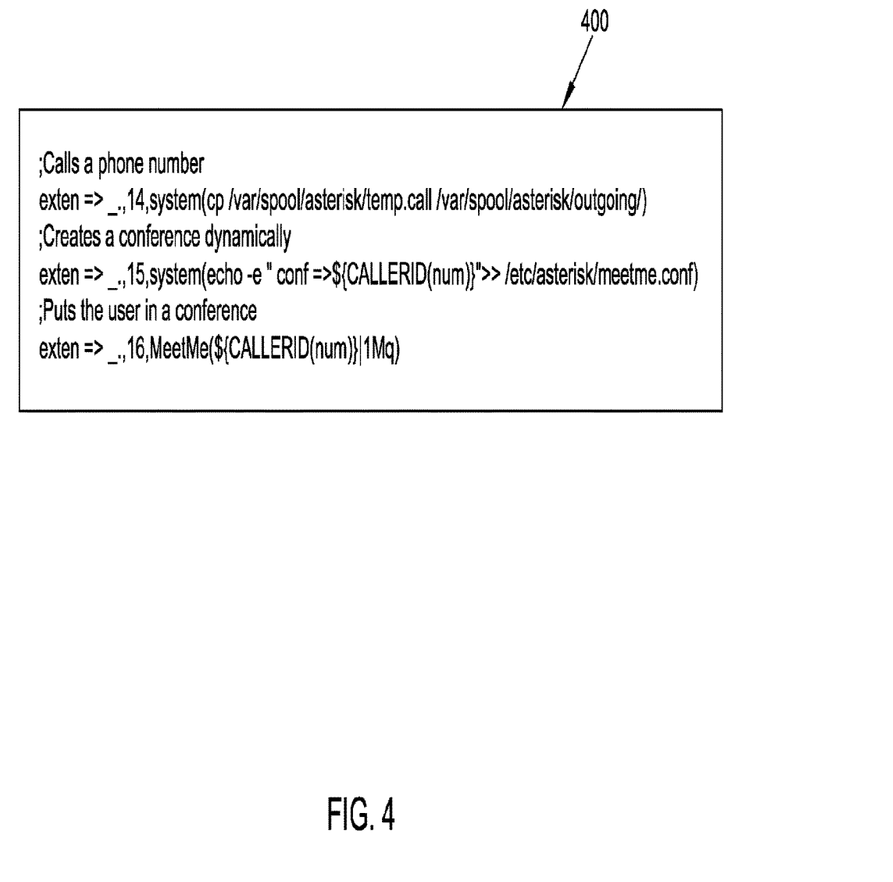
FIG. 4 is a diagram of a snippet of a dialplan that can be used in accordance with some embodiments.

FIG. 4 shows a snippet 400 of a dialplan that can be used in some embodiments. This dialplan snippet gives a callback to the user whose call has been forwarded to Asterisk and then dynamically creates a conference. A database of all the users who are subscribers with a dual-mode endpoint (and who can, therefore, perform a handoff can be maintained to determine if a user is a user-A-type or a user-B-type of user.

Figure 5:
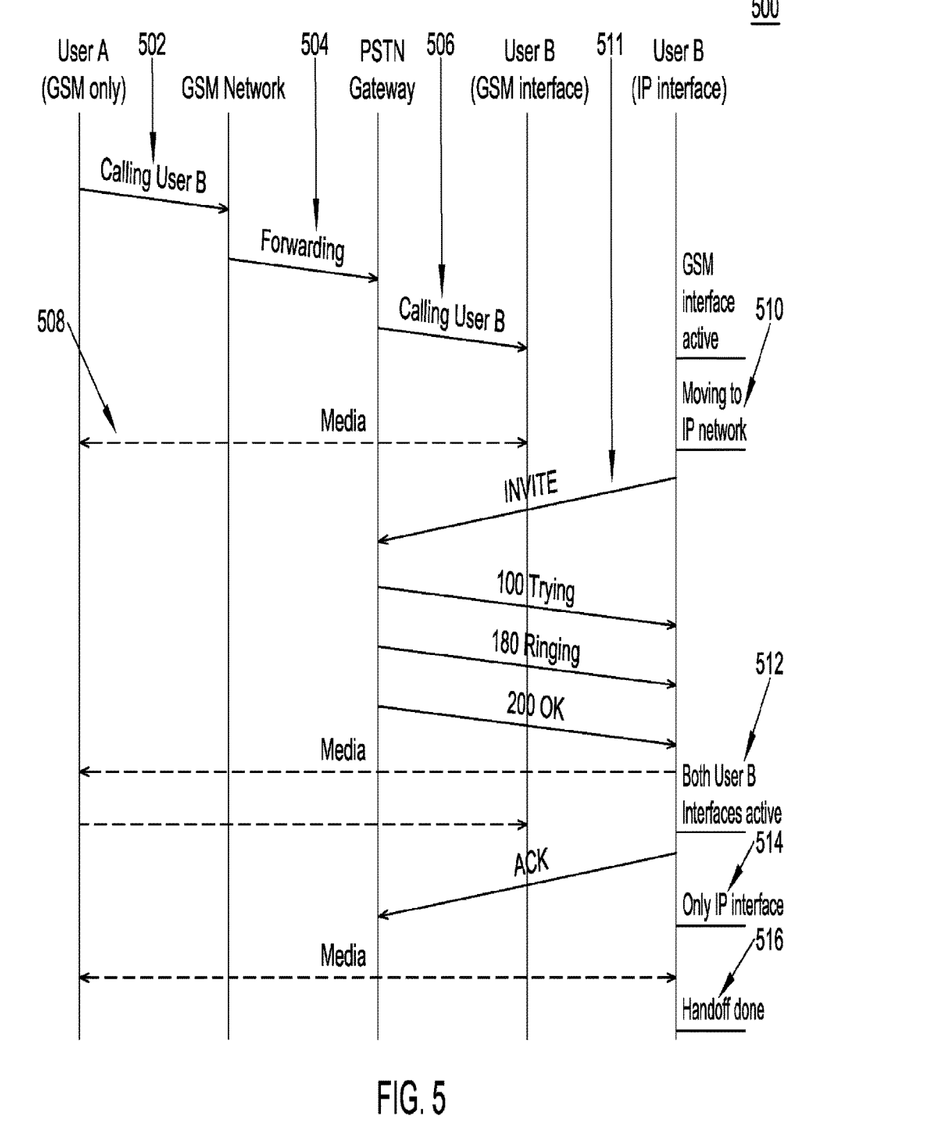
FIG. 5 is a diagram of process for setting-up and handing-off a call in a first scenario that can be used in accordance with some embodiments.

Turning to FIGS. 5-8, four examples of handoff scenarios are described in accordance with some embodiments. As shown in FIG. 5, in a first scenario 500, a user A makes a call to a user 13 while user B is on user B's GSM network at 502. User B's network then forwards the call initiated by user A to the ISDN PRI gateway in a network element using "call forward on busy" (CFB) at 504. In some embodiments, whenever a call gets forwarded, the diverted-from number (in this case, user B's number) is also sent to the diverted-to user (in this case, the gateway) as illustrated in connection with FIGS. 2 and 3. This information element contains the number of user B.

As described above, the network element can also act as a SIP conference server. User A is then put in a conference and waits for user B to be connected to the same conference. The conference can be created dynamically with the caller-id of the incoming call used as the conference identifier. While user A is waiting in this conference, the ISDN PRI gateway next calls user B on the GSM interface and connects user B to the conference at 506. At this point, the call from user A to user B is divided into two segments, one from user A to the gateway and another from the gateway to user B, and both users are connected to the same conference and can start talking at 508.

If, at 510, user B moves to a location where an 801.11 IP network (or any other suitable network) is available, handoff to the IP network can occur at 511. Since such a handoff is a soft handoff, user B can connect to the same conference of its GSM interface using its IP interface and the conference identifier of the existing conference with user A. For a small duration at 512, all three interfaces, that is, one interface of user A and two interfaces of user B, are in the same conference. The GSM interface of user B is then removed from the conference at 514 after its IP interface has finished joining the conference. Once the GSM interface has been removed at 516, the handoff is complete.

Figure 6:
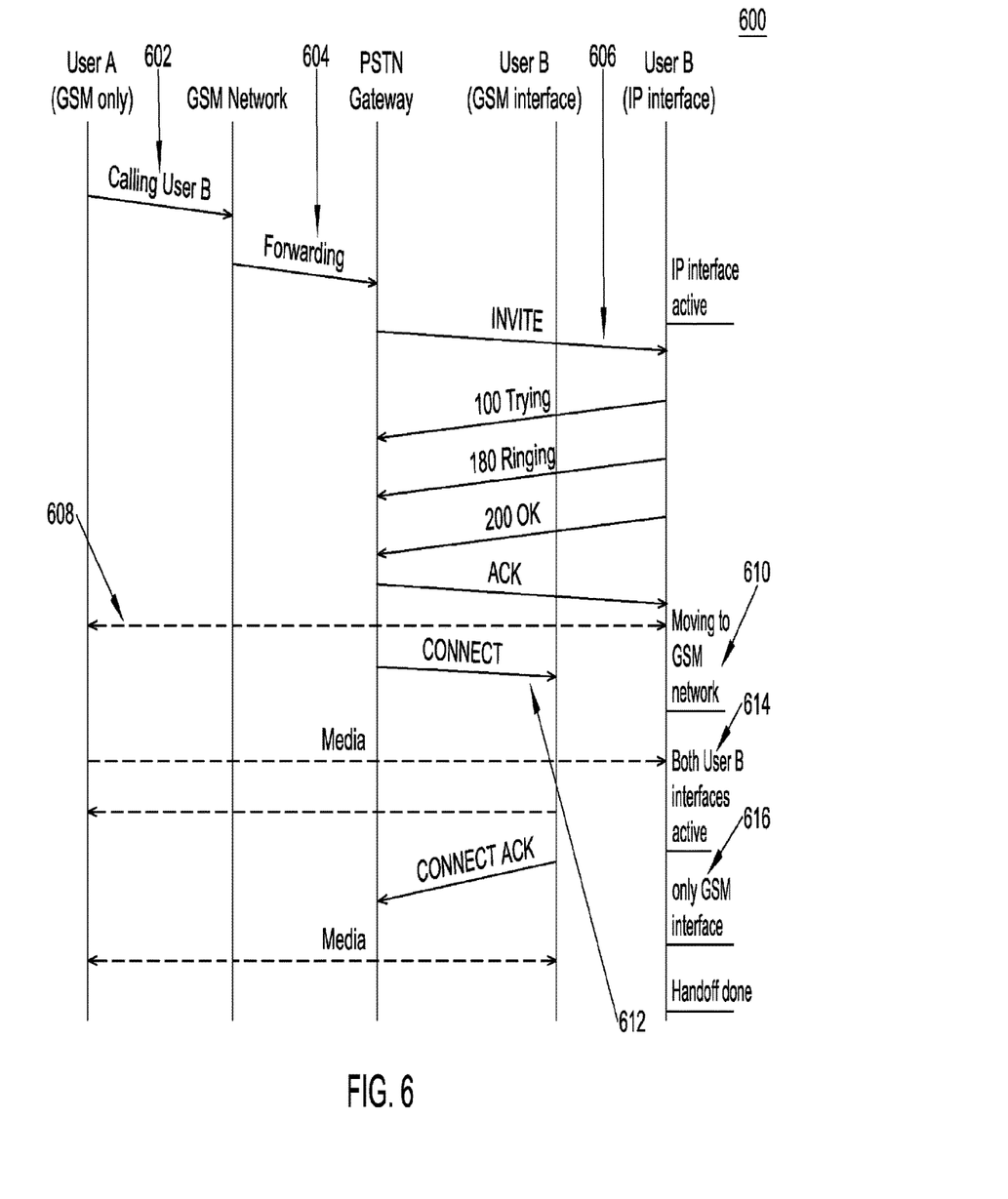
FIG. 6 is a diagram of process for setting-up and handing-off a call m a second scenario that can be used in accordance with some embodiments.

As shown in FIG. 6, in a second scenario 600, user A makes a call to user B while user B is on its IP interface, such as when user B is connected to an 802.11 network (or an other suitable network). This scenario begins by user A calling user B on user B's GSM network at 602. The call then gets forwarded by user B's GSM network to the ISDN PRI gateway using CFB and connected to a conference at 604. Because user B is using the 801.11 network in this scenario, the ISDN PRI gateway calls user B on the IP interface and connects user B to the conference at 606. At this point, the call from user A to user B is divided into two segments, one from user A to the gateway on the GSM network and another from the gateway to user B on the IP network, and both users are connected to the same conference and can start talking at 608.

In some embodiments, when user B moves from the IP network to the GSM network at 610, the gateway calls the GSM interface of user B's handset and adds this GSM interface to the same conference at 612 so that both the IP and GSM interfaces of user B's endpoint are active at 614. After the GSM interface has been added to the conference, the IP interface is removed so that only the GSM interface is active at 616 and then the handoff is complete.

Additionally or alternatively, in some embodiments, when user B moves from the IP network to the GSM network at 610, user B's endpoint sends a REFER message to the gateway. When the gateway receives this REFER message, it makes a call to the GSM interface of user B and adds it to the same conference as user B's IP interface. As mentioned above, once the GSM interface has joined such conference, the IP interface gets removed and the handoff can be considered complete.

Figure 7:
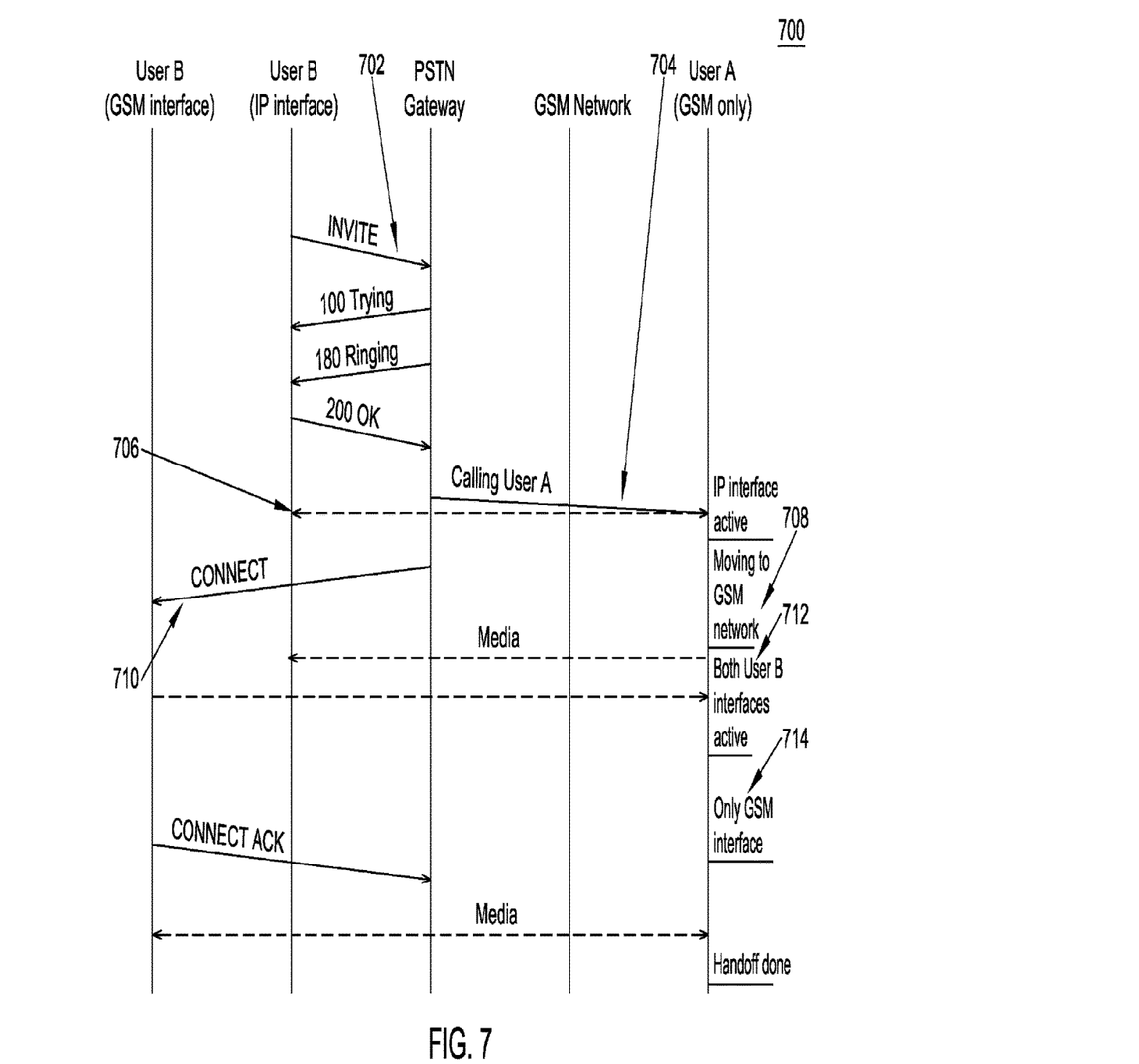
FIG. 7 is a diagram of process for setting-up and handing-off a call in a third scenario that can be used in accordance with some embodiments.

As shown in FIG. 7, in a third scenario 700, a user B, while on its IP interface, makes a cull to user A. This is achieved by user B's endpoint first calling, via SIP, the ISDN PRI gateway of the network element and connecting to the SIP proxy and a conference in the conference server of the network element at 702. Here the number to be called is present in the "To header" as pan of the SIP URI. The "From URI" contains the telephone number associated with user B to identify the IP interface and the GSM interface of the endpoint. For example, the From of user B could be 1234567890@sipproxy.com, where 1234567890 is the telephone number of the GSM interface of user B.

The gateway then calls user A on the GSM network and connects user A to the conference at 704. At this point users A and B are connected at 706.

In some embodiments, when user B moves from the IP network to the GSM network at 708, the gateway calls the GSM interface of user B's endpoint and adds this GSM interface to the same conference at 710 so that both the IP and GSM interfaces of user B's endpoint are active at 712. After the GSM interface has been added to the conference, the IP interface is removed so that only the GSM interface is active at 714 and then the handoff is complete.

Additionally or alternatively, in some embodiments, when user B moves from the IP network to the GSM network at 708, user B's endpoint sends a REFER message to the gateway. When the gateway receives this REFER message, it makes a call to the GSM interface of user B and adds it to the same conference as user B's IP interface. As mentioned above, once the GSM interface has joined such conference, the IP interface gets removed and the handoff can be considered complete.

Figure 8:
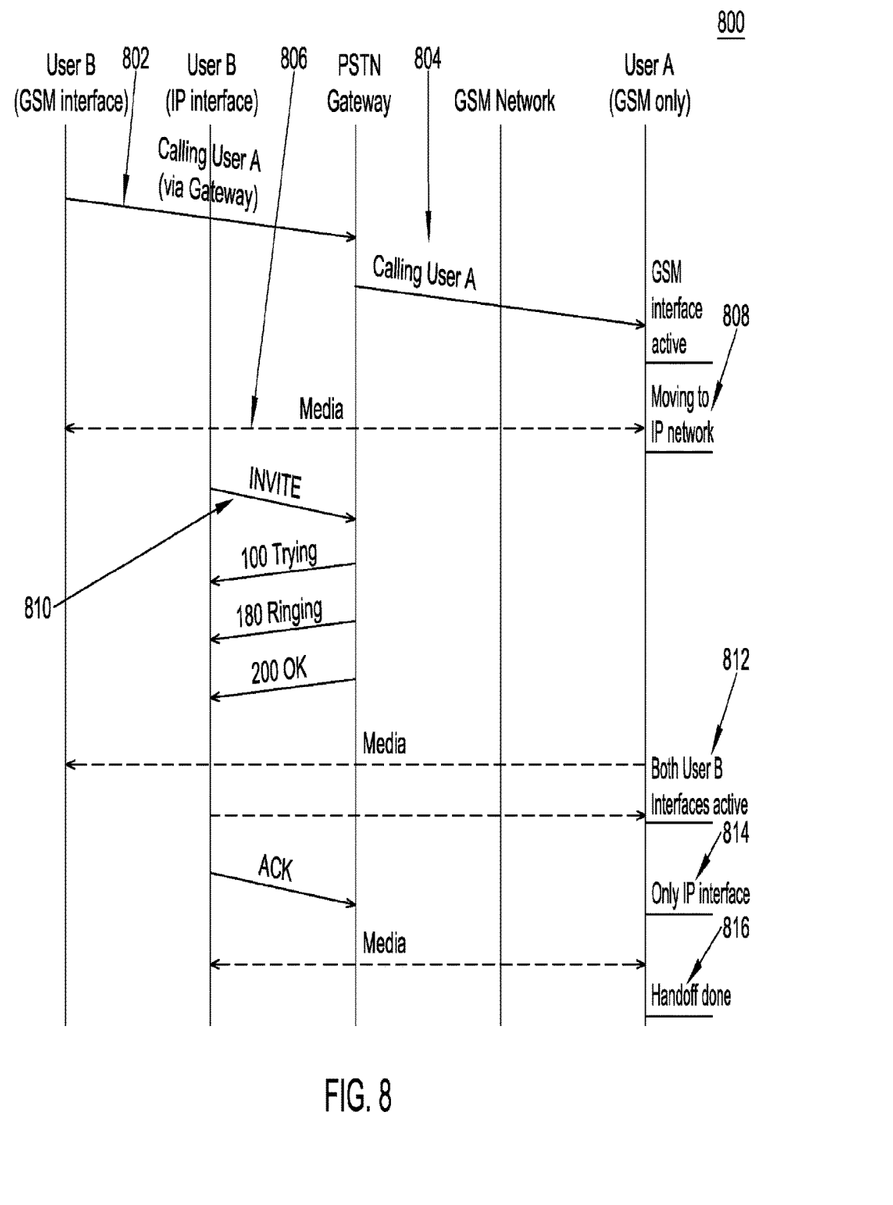
FIG. 8 is a diagram of process for setting-up and handing-off a call in a fourth scenario that can be used in accordance with some embodiments.

As shown in FIG. 8, in a third scenario 800, user B, while on its GSM interface, makes a call to user A. This is achieved by user B's endpoint first calling the gateway via its GSM interface at 802. The destination number of user A's endpoint can be sent to the gateway using Dual-Tone Multi-Frequency (DTMF) signaling. For example, a two-phase dialing process where the call connects to the gateway first and then user A's number is dialed can be used. As a more particular example, d user B wants to call 1234567890, which is use A's number, and the gateway's number is 1-212-555-1234, then the number to be dialed can be "12125551234p1234567890," where "p" represents a pause. In some embodiments, user B would have already added the gateway's number while configuring the application, so that the only number user B would have to dial is user A's number. The gateway then makes an ISDN call to user A at 804 and conferences users A and B at 806.

If at 808, user B moves to a location where an 801.11 IP network (or any other suitable network) is available, handoff to the IP network can occur at 810. Since such a handoff is a soft handoff, user B can connect to the same conference of its GSM interface using its IP interface, and the conference ID of the existing conference with user A. For a small duration at 812, all three interfaces, that is, one interface of user A and two interfaces of user B, are in the same conference. The GSM interface of user B is then removed from the conference at 814 after its IP interface has finished joining the conference. Once the GSM interface has been removed at 816, the handoff is complete.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. For example, while the description above refers to calls between different users, such calls should not be considered to be limited to traditional telephone calls or video telephone calls, but can include any suitable content being transmitted between any two or more parties (which can be people and/or machines) via any suitable category of electronic connection. As another example, while the description above refers to GSM networks and IP networks, any suitable types of networks can be used \s yet another example, while the description refers to handsets, any suitable portable or fixed-location devices can be used, such as computers (such as laptop computers, tablet computers, etc.), servers, media streaming devices, automobiles, boats, planes, etc. Features of the disclosed embodiments can be combined and rearranged in various ways.

What is claimed is:

1. A system for implementing call handoff between networks, comprising:
at least one device that:
receives a call from a first endpoint specifying a second endpoint, wherein each of the first endpoint and the second endpoint are remote from the at least one device;
creates a conference in response to receiving the call specifying the second endpoint;
establishes a connection between the first endpoint and the conference;
calls the second endpoint specified by the call from the first endpoint;
establishes a connection between the second endpoint and the conference in response to calling the second endpoint; and
when one of the first endpoint and the second endpoint is able to be connected to a different network from a current network which the one of the first endpoint and the second endpoint is connected to the conference:
establishes a connection between the conference and the one of the first endpoint and the second endpoint via the different network; and
removes the connection via the current network between the one of the first endpoint and the second endpoint and the conference.

2. The system of claim 1, wherein the at least one device provides a gateway, a proxy, and a conference server.

3. The system of claim 2, wherein the at least one device comprises separate components for at least two of the gateway, the proxy, and the conference server.

4. The system of claim 1, wherein the at least one device provides at least one network appliance.

5. The system of claim 1, wherein at least one of the first endpoint and the second endpoint is a handset.

6. The system of claim 5, wherein the handset is a mobile telephone.

7. The system of claim 1, wherein one of the current network and the different network is an Internet protocol network.

8. The system of claim 7, wherein the other of the current network and the different network is a mobile telephone network.

9. A method for implementing call handoff between networks, comprising:
receiving a call from a first endpoint specifying a second endpoint using at least one device comprising a hardware processor, wherein each of the first endpoint and the second endpoint are remote from the at least one device;
creating, the at least one device, a conference in response to receiving the call specifying the second endpoint;
establishing, the at least one device, a connection between the first endpoint and the conference;
calling, the at least one device, the second endpoint specified by the call from the first endpoint;
establishing the at least one device, a connection between the second endpoint and the conference in response to calling the second endpoint; and
when one of the first endpoint and the second endpoint is able to be connected to a different network from a current network which the one of the first endpoint and the second endpoint is connected to the conference:
establishing, the at least one device, a connection between the conference and the one of the first endpoint and the second endpoint via the different network; and
removing, the at least one device, the connection via the current network between the one of the first endpoint and the second endpoint and the conference.

10. The method of claim 9, wherein the at least one device provides a gateway, a proxy, and a conference server.

11. The method of claim 10, wherein at least two of the gateway, the proxy, and the conference server are provided in separate components.

12. The method of claim 9, further comprising providing at least one network appliance.

13. The method of claim 9, wherein at least one of the first endpoint and the second endpoint is a handset.

14. The method of claim 13, wherein the handset is a mobile telephone.

15. The method of claim 9, wherein one of the current network and the different network is an Internet protocol network.

16. The method of claim 15, wherein the other of the current network and the different network is a mobile telephone network.

17. A non-transitory computer-readable medium containing computer-executable instructions that, when executed by a processor, cause the processor to perform a method for implementing call handoff between networks, the method comprising:
receiving a call from a first endpoint specifying a second endpoint using at least one device, wherein each of the first endpoint and the second endpoint are remote from the at least one device;
creating, the at least one device, a conference in response to receiving the call specifying the second endpoint;
establishing, the at least one device, a connection between the first endpoint and the conference;
calling, the at least one device, the second endpoint specified by the call from the first endpoint;
establishing the at least one device, a connection between the second endpoint and the conference in response to calling the second endpoint; and
when one of the first endpoint and the second endpoint is able to be connected to a different network from a current network which the one of the first endpoint and the second endpoint is connected to the conference:
establishing, the at least one device, a connection between the conference and the one of the first endpoint and the second endpoint via the different network; and
removing the at least one device, the connection via the current network between the one of the first endpoint and the second endpoint and the conference.

18. The medium of claim 17, wherein the wherein the at least one device provides a gateway, a proxy, and a conference server.

19. The medium of claim 18, wherein at least two of the gateway, the proxy, and the conference server are provided in separate components.

20. The medium of claim 17, wherein the method further comprises providing at least one network appliance.

21. The medium of claim 17, wherein at least one of the first endpoint and the second endpoint is a handset.

22. The medium of claim 21, wherein the handset is a mobile telephone.

23. The medium of claim 17, wherein one of the current network and the different network is an Internet protocol network.

24. The medium of claim 23, wherein the other of the current network and the different network is a mobile telephone network.

* * * * *

UNITED STATES PATENT AND TRADEMARK OFFICE
CERTIFICATE OF CORRECTION

PATENT NO. : 10,039,033 B2
APPLICATION NO. : 13/000328
DATED : July 31, 2018
INVENTOR(S) : Andrea G Forte et al.

Page 1 of 1

It is certified that error appears in the above-identified patent and that said Letters Patent is hereby corrected as shown below:

In the Claims

Column 9, Line 16, "creating, the at least one device" should be --creating, using the at least one device--.

Column 9, Line 18, "establishing, the at least one device" should be --establishing, using the at least one device--.

Column 9, Line 20, "calling, the at least one device" should be --calling, using the at least one device--.

Column 9, Line 22, "establishing the at least one device" should be --establishing, using the at least one device--.

Column 10, Line 13, "creating, the at least one device" should be --establishing, using the at least one device--.

Column 10, Line 15, "establishing, the at least one device" should be --establishing, using the at least one device--.

Column 10, Line 17, "calling, the at least one device" should be --calling, using the at least one device--.

Column 10, Line 19, "establishing the at least one device" should be --establishing, using the at least one device--.

Signed and Sealed this
Eleventh Day of September, 2018

Andrei Iancu
*Director of the United States Patent and Trademark Office*